(12) United States Patent
Barmichev et al.

(10) Patent No.: US 8,746,616 B2
(45) Date of Patent: Jun. 10, 2014

(54) MID-WING MULTI-DECK AIRPLANE

(75) Inventors: Sergey D. Barmichev, Kirkland, WA (US); Mithra M. K. V. Sandrithi, Lake Forest Park, WA (US); Kevin M. Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 156 days.

(21) Appl. No.: 13/276,357

(22) Filed: Oct. 19, 2011

(65) Prior Publication Data

US 2013/0099053 A1 Apr. 25, 2013

(51) Int. Cl.
*B64C 25/14* (2006.01)
*B64C 25/20* (2006.01)

(52) U.S. Cl.
USPC ............ 244/102 R; 244/118.5; 244/118.6; 244/119; 244/120; 244/130; 244/137.2; 244/73 R; 244/65; 244/91

(58) Field of Classification Search
USPC ....... 244/118.5, 118.6, 119, 120, 130, 137.2, 244/73 R, 65, 91, 102 R
See application file for complete search history.

(56) References Cited

U.S. PATENT DOCUMENTS

| | | | |
|---|---|---|---|
| 4,448,372 A * | 5/1984 | Larson | 244/87 |
| 4,674,712 A * | 6/1987 | Whitener et al. | 244/119 |
| 5,115,999 A * | 5/1992 | Buchsel et al. | 244/118.5 |
| 5,542,626 A * | 8/1996 | Beuck et al. | 244/107 |
| 5,992,797 A * | 11/1999 | Seidel et al. | 244/118.5 |
| 6,478,253 B1 * | 11/2002 | Seidel | 244/119 |
| 6,575,406 B2 * | 6/2003 | Nelson | 244/119 |
| 6,705,567 B2 * | 3/2004 | Dong et al. | 244/13 |
| 6,772,977 B2 | 8/2004 | Dees et al. | |
| 6,857,598 B2 | 2/2005 | Adamson et al. | |
| 7,395,989 B2 * | 7/2008 | Saint-Jalmes et al. | 244/118.1 |
| 7,562,845 B2 * | 7/2009 | Schoene | 244/119 |
| 7,575,194 B2 | 8/2009 | Brown et al. | |
| 7,887,009 B2 | 2/2011 | Keeler, Jr. et al. | |

(Continued)

FOREIGN PATENT DOCUMENTS

EP 0514650 A1 11/1992
WO 2008102278 A9 8/2008

OTHER PUBLICATIONS

SBAC Aviation and Environment Briefing Papers, Carrie Lambert, Jun. 2008, pp. 1-8.*
SBAC. 'SBAC Aviation and Environment Briefing Papers' p. 4.*

(Continued)

*Primary Examiner* — Isam Alsomiri
*Assistant Examiner* — Assres H Woldemaryam
(74) *Attorney, Agent, or Firm* — Ostrager Chong Flaherty & Broitman P.C.

(57) ABSTRACT

An airplane comprises a twin-deck fuselage in which an upper deck support structure is utilized for carry-through of a mid-mount main wing box. The main landing gear of the airplane is mounted to the fuselage and is stowed in a non-pressurized area below the main wing box (enabled due to an optimized wing box geometry). A pressurized passageway/cargo/galley complex separates the main landing gear box and the main wing box. The upper deck is continuous, while the lower deck is separated by the wheel wells into two distinct fore and aft areas (for either cargo or passengers). The airplane further comprises an integrated vertical fin and an aft-extended pressurized deck area for reduced double-deck wetted area. More specifically, the double-deck pressurized fuselage structure is extended to form a blending structure to which a structural box of the vertical fin is attached.

23 Claims, 15 Drawing Sheets

(56) References Cited

U.S. PATENT DOCUMENTS

| | | | |
|---|---|---|---|
| 7,900,865 B2 | 3/2011 | Moore et al. | |
| 7,900,868 B2 | 3/2011 | Sankrithi et al. | |
| 8,025,253 B2* | 9/2011 | Sprenger | 244/121 |
| 8,118,259 B2* | 2/2012 | Guering | 244/119 |
| 2002/0153454 A1* | 10/2002 | Seidel | 244/119 |
| 2004/0007647 A1* | 1/2004 | Dong et al. | 244/165 |
| 2004/0075025 A1* | 4/2004 | Dees et al. | 244/119 |
| 2004/0245375 A1* | 12/2004 | Adamson et al. | 244/15 |
| 2006/0214057 A1* | 9/2006 | Saint-Jalmes et al. | 244/118.6 |
| 2007/0176047 A1 | 8/2007 | Moore et al. | |
| 2008/0251641 A1* | 10/2008 | Sprenger | 244/118.5 |
| 2009/0283637 A1* | 11/2009 | Nolla | 244/119 |
| 2010/0187352 A1* | 7/2010 | Yavilevich | 244/36 |
| 2012/0160968 A1 | 6/2012 | Barmichev et al. | |

OTHER PUBLICATIONS

Breguet Deux-Ponts, Information from Wikipedia and one supplemental sheet of drawing {in submitted file named Breguet_Double-Deck-Aircraft_Public-Info.pdf).

U.S. Appl. No. 12/471,391, filed May 24, 2009 and entitled "Mid-Wing Airplane"; assigned to The Boeing Company.

* cited by examiner

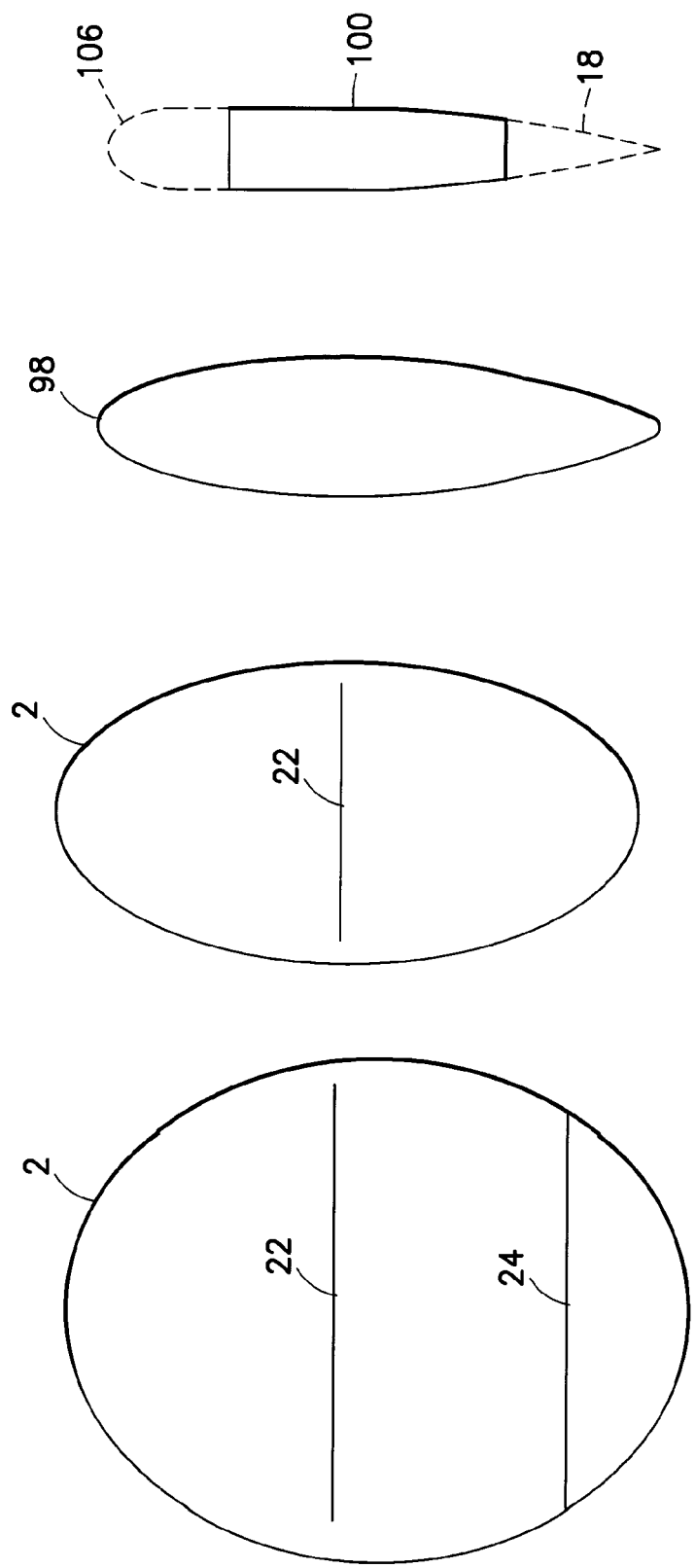

MID-WING MULTI-DECK AIRPLANE

BACKGROUND

This disclosure generally relates to multi-deck aircraft and, more particularly, relates to multi-deck airplanes having a tube-type fuselage and a mid-level wing that passes through the fuselage.

Advanced designs for high-capacity commercial and military airplanes require operating efficiency combined with reduced emissions and low noise. In order to meet these requirements, super-high bypass ratio jet engines, such as geared turbo fan or open-rotor jet engines may be used. These engines typically employ larger-diameter engine fans, rotors and/or nacelles which, because of their size, may place design constraints on other components of the airplane. For example, larger-diameter engines mounted beneath the primary lifting wing on the airplane may require excessive inboard wing shear and associated large weight penalties on a low-wing airplane configuration, or alternatively may require that the wing be positioned at a higher level on the fuselage in order to provide sufficient ground clearance beneath the engines. This higher placement of the wing on the fuselage may in turn place constraints on the configuration of payload-carrying decks within the fuselage.

Traditional commercial aircraft have been designed around a simple circular tube to carry passengers and cargo and a wing. The traditional airplane configuration places all passengers on one deck and cargo on a lower deck. To configure an airplane in the traditional approach, a passenger count and seat width dimension is decided and then the airplane is wrapped around this seat arrangement. The close wrapping of cargo and passengers at the same time is not a traditional approach.

When designing a new airplane, many other factors need to be considered. The world airplane market is becoming increasingly sensitive to fossil fuel burn, which can be measured by the airplane specific fuel consumption and emissions. A direct correlation to fuel burn can be drawn to the airplane wetted area: the smaller the wetted area, the lower the drag on the airplane. Aircraft noise is also becoming more of an issue, especially during airport operations and during approach and departure. Furthermore, the commercial aviation industry has traditionally surveyed North America and the European markets, where the air transportation infrastructure can be crowded, and one of the parameters to gauge an aircraft concept is the footprint size of the airplane. A smaller footprint size for a given passenger capacity is desirable. In addition, as labor becomes more expensive worldwide and airlines rely on revenue cargo operation for profits, containerized cargo assists airlines not only turn the airplane quicker between flights, but also helps airlines lower labor costs and potential personnel injury issues. Faster airplane turn times have a great value to an airline. The ability to utilize dual boarding and departure operations can help decrease airplane turn times. Most airplanes do not allow for dual deck utilization for passengers and containerized cargo.

Accordingly, there is a need for a mid-wing multi-deck airplane that allows the use of high-efficiency, large-diameter engines with minimal adverse impact on the capacity and layout of payload-carrying decks and that has a configuration which allows the wetted area and footprint size to be optimized for a particular payload capacity.

SUMMARY

The aircraft configuration disclosed hereinafter includes features which address the above-discussed needs. This aircraft configuration has less wetted area per passenger seat than traditional commercial aircraft configurations and configurations such as blended wing body aircraft. This aircraft configuration includes two decks which allow for a small footprint size. This aircraft configuration also allows for containerized cargo on a single-aisle sized aircraft while still carrying a high passenger load on the upper deck and on a split lower deck. This aircraft configuration gives airlines options with respect to how to balance passenger/cargo ratios, and allows the airlines flexibility and the ability to easily change the aircraft configuration to meet changing market demands. The aircraft can be built or configured from all passenger lay-outs to all cargo lay-outs. This aircraft configuration also allows for multiple aircraft engine configurations to be incorporated on the same aircraft design to meet airline customer needs. The configuration can easily accommodate large open-rotor engines, turbo props or high-bypass jet engines without changing the wing or fuselage designs. Being able to offer several different types of engines is not only beneficial to the airline customers by allowing them to tailor the aircraft to meet their needs, but allows the aircraft manufacturer to tailor the same basic aircraft to meet different market segments.

In accordance with one aspect of the configurations disclosed hereinafter, the airplane comprises a twin-deck fuselage in which an upper deck support structure is utilized for carry-through of a mid-mount main wing box. The main landing gear of the airplane is mounted to the fuselage and is stowed in a non-pressurized area below the main wing box (enabled due to an optimized wing box geometry that includes un-swept inboard wing box sections). A pressurized passageway/cargo/galley complex separates the main landing gear and the main wing box. The upper deck is continuous, while the lower deck is separated into two distinct forward and aft areas (for either cargo or passengers). The lower deck areas may be designed to stow one row of cargo containers above or on top of another row of cargo containers. This configuration supports large turbo fan or turbo prop/open rotor engines.

In accordance with another aspect of the configurations disclosed hereinafter, the airplane comprises an integrated vertical fin and an aft-extended pressurized upper deck area for reduced double-deck wetted area. More specifically, the double-deck fuselage structure is extended to form a blending structure that transitions into a structural box of the vertical fin. The fuselage structure undergoes three-dimensional blending from an oval to a flat section. The aft pressure bulkhead forms an airtight boundary between the pressurized upper deck area space and the unpressurized space behind the bulkhead. The upper deck extends to the aft pressure bulkhead. A rudder mounted to a rear spar of the vertical tail structural box can be extended to a lower fuselage keel line.

More specifically, the fuselage comprises a plurality of stringers which extend at least from the bulkhead to a distal end of the vertical fin, the stringers being continuous or spliced. The fuselage further comprises a skin which extends at least from the bulkhead to a distal end of the vertical fin portion, the skin also being continuous or spliced. There is no break (or discontinuity) in the structural load path or in the aerodynamic surfaces of the extended fuselage as the latter blends into the vertical fin.

This configuration or aircraft lay-out enables the potential application of multiple engine types, including open-rotor and high-bypass-ratio turbofan engines. It also provides an airplane that can very quickly be converted to all-cargo or all-passenger configurations. Because of the innovative approach taken for wing placement and vertical fin integration, this airplane has a lower wetted surface area than other airplanes with a similar seat count. Wetted area can be equated to drag and equivalent fuel burn.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

FIGS. 18A-18D show the outer profiles at respective cross sections indicated by lines A-A, B-B, C-C and D-D in FIG. 18.

Reference will hereinafter be made to the drawings in which similar elements in different drawings bear the same reference numerals.

DETAILED DESCRIPTION

In accordance with the embodiments disclosed hereinafter, a multi-deck airplane has a wing mounted on the fuselage at the level of an upper deck. The wing comprises first and second wing panels disposed on opposite sides of the fuselage. The wing further includes a carry-through structure (i.e., the central portion of a wing box) within the fuselage that connects the wing panels (i.e., the primary airfoils). The wing box passes transversely through the fuselage with opposite ends thereof supporting the respective airfoils. At least one engine is mounted beneath each of the wing panels. The airplane may further comprise a main landing gear mounted on and retractable substantially entirely within the fuselage beneath the wing carry-through structure, i.e., the central section of the wing box disposed within the fuselage. The wing-box may include upper and lower structural panels connected to forward and aft wing spars that extend through the fuselage, forming un-swept inboard wing box sections on opposite sides of the fuselage.

Figure 1:
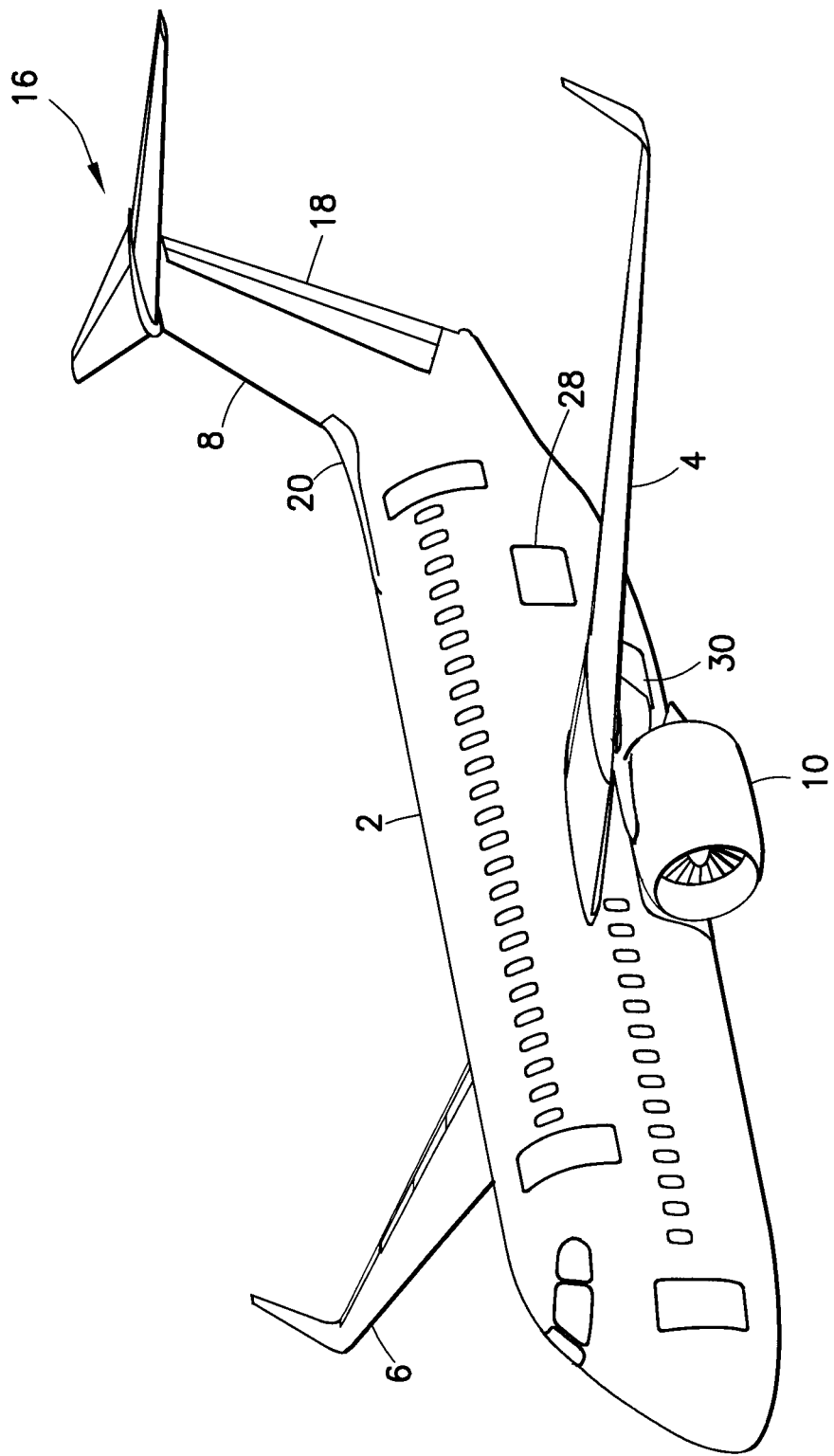
FIG. 1 is a diagram showing an isometric view of a mid-wing double-deck airplane having wing-mounted high-by-pass-ratio turbofan engines in accordance with one embodiment.
Figure 2:
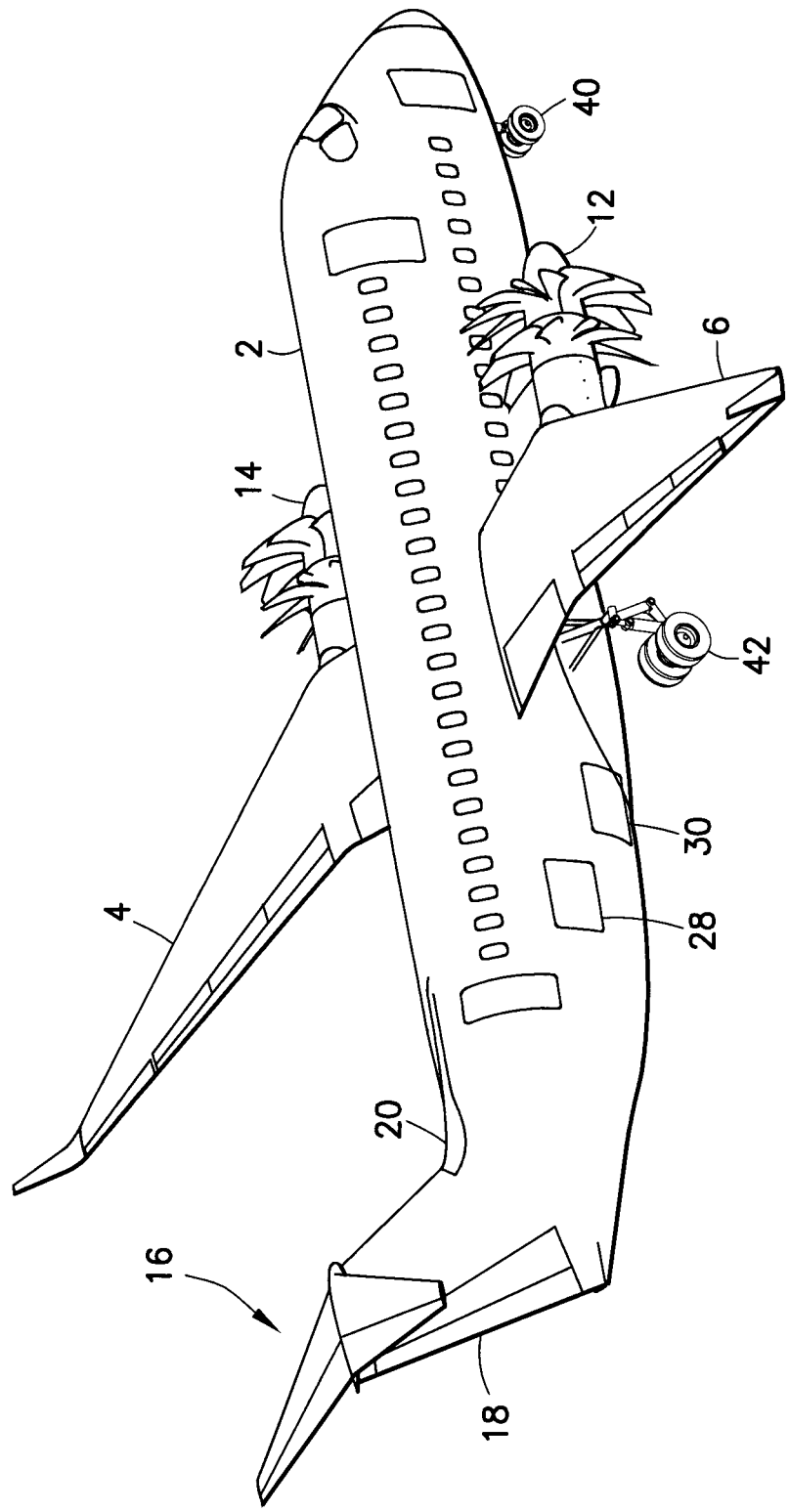
FIG. 2 is a diagram showing an isometric view of a mid-wing double-deck airplane having wing-mounted open-rotor engines in accordance with another embodiment.

FIGS. 1 and 2 show two mid-wing double-deck airplanes in accordance with two embodiments of the foregoing type. Both embodiments have an upper cabin and a forward lower cabin configured to seat passengers inside the fuselage, the extent of those cabins being evident from the passenger windows. The primary difference between the these exemplary airplanes is that the one in FIG. 1 has a pair of wing-mounted high-bypass-ration turbofan engines 10 (only one of which is shown), whereas the airplane in FIG. 2 has a pair of wing-mounted open-rotor engines 12 and 14.

As seen in FIGS. 1 and 2, both airplanes comprise a tubular fuselage 2, a mid-wing comprising a pair of wing panels (primary airfoils) 4 and 6, and an empennage comprising a vertical fin or blade 8 that is integrated with an aft portion of the fuselage 2 and a T-tail 16 (with horizontal stabilizers) attached to the distal end of the vertical fin 8. A rudder 18 is pivotable coupled to a trailing edge of the vertical fin 8. In addition, each airplane has a sharp dorsail 20 for improved vertical tail efficiency. Each airplane further comprises a nose gear 40 and a main landing gear comprising a pair of main gear units, only one main gear unit 42 of which is visible in FIG. 2. (The main gear units are not visible in FIG. 1.)

Figure 3:
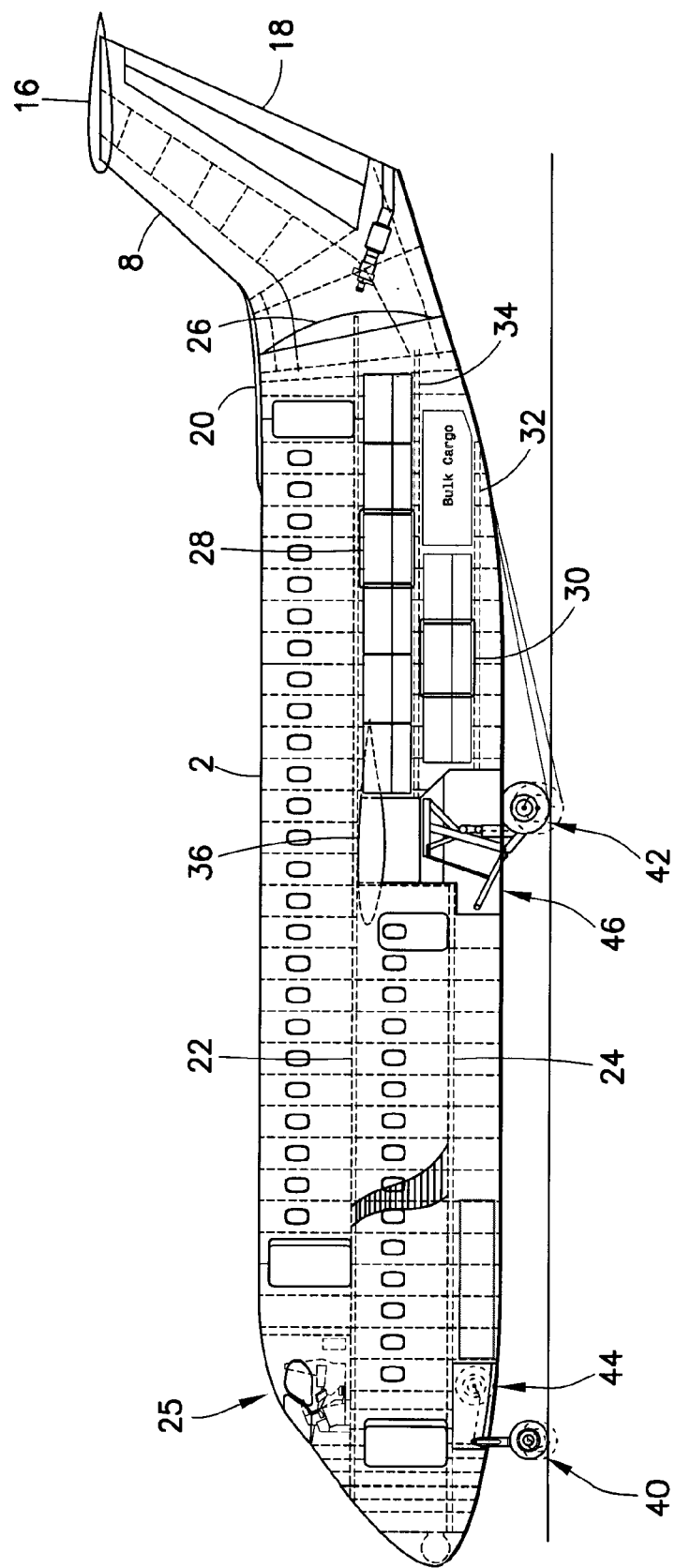
FIG. 3 is a diagram showing a side view of a double-deck airplane of the type depicted in either FIG. 1 or FIG. 2, configured to carry passengers in a forward portion and cargo in an aft portion of the lower deck in accordance with one embodiment. The wing and engine on the left side of the airplane are not shown to allow the relative positions of the main wing box and the main landing gear to be seen.

FIG. 3 shows internal structure common to both airplanes of FIGS. 1 and 2. The fuselage 2 has a semi-monocoque construction with a multiplicity of circumferential frames (not shown) covered by a skin in a manner known in the art. The fuselage 2 comprises a central portion (where a wing box 36 traverses the fuselage 2), a forward portion extending forward of the central portion, and an aft portion extending aft of the central portion. An upper cabin having an upper deck 22 extends continuously from the forward to aft portion of the fuselage and is fitted with seats for passengers. More precisely, the upper deck 22 extends from the cockpit 25 to an aft pressure bulkhead 26. The wing box 36 is the primary load-carrying structure of the wing panels and has a well-known enclosed box structure. The wing box 36 may be built into and supported in part by the upper deck support structure (not shown in FIG. 3, but see FIG. 9 later). The dashed lines extending from wing box 36 in FIG. 3 indicate the outline of the wing panels at a point adjacent the fuselage.

Each airplane shown in FIGS. 1 and 2 further comprises a lower deck which is discontinuous. As shown in FIG. 3, the lower deck comprises a forward lower deck 24 disposed in a forward portion of the fuselage 2 (i.e., forward of the wing box) and an aft lower deck 32 disposed in the aft portion of the fuselage 2 (i.e., aft of the wing box). The forward and aft lower decks 24 and 32 (respectively) are separated by respective spaces (i.e., wheel wells) below the wing box 36 where the main gear units are stowed. FIG. 3 shows a main gear unit 42 in a deployed state and a wheel well 46 for receiving the main gear unit when it is stowed. The wheel wells and main gear units are designed so that the main gear units fit entirely (or nearly entirely) within the fuselage when they are stowed. FIG. 3 also shows a nose gear 40 in a deployed state and a wheel well 44 for receiving the nose gear when it is stowed.

In the embodiment depicted in FIG. 3, a forward lower cabin is disposed between upper deck 22 and forward lower deck 24. The forward lower deck 24 is fitted with seats for passengers. The lower portion of the aft portion of the fuselage comprises a dual-level cargo hold with a door on each level. These doors are indicated by reference numerals 28 and 30 in FIG. 3. As seen in FIG. 3, the lower level of the aft cargo hold is disposed between the aft lower deck 32 and an aft middle deck 34, while the upper level of the aft cargo hold is disposed between the aft middle deck 34 and the upper deck 22.

Figure 4:
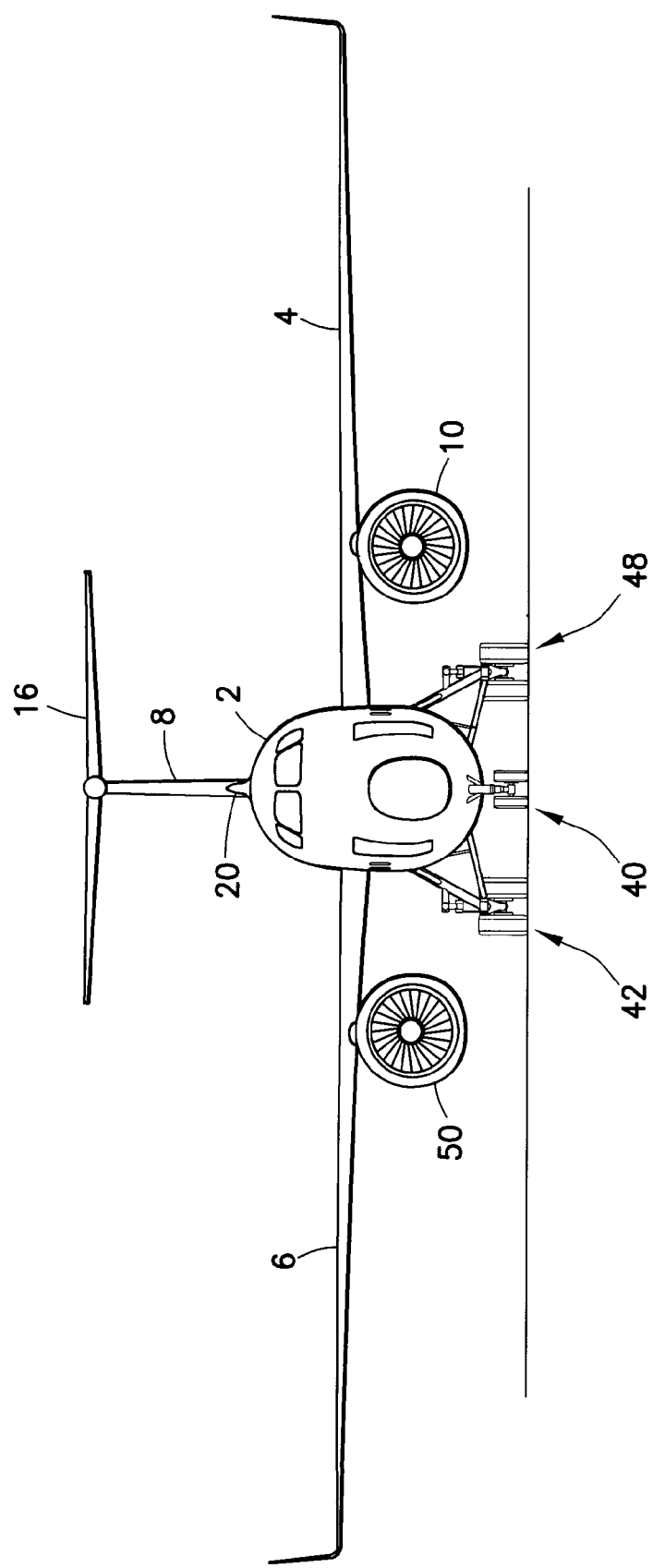
FIGS. 4 and 5 are diagrams showing front views of the airplanes respectively depicted in FIGS. 1 and 2.
Figure 5:
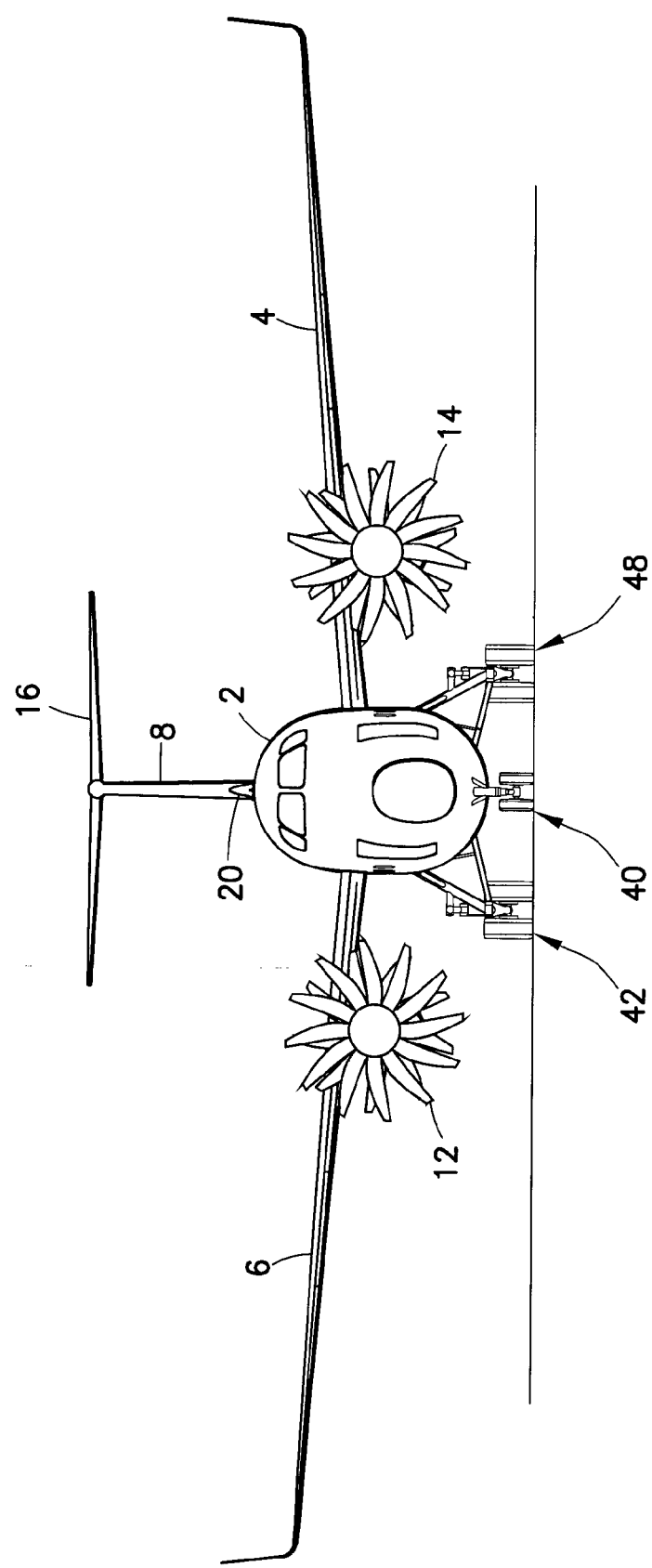

FIGS. 4 and 5 are front views of the airplanes respectively depicted in FIGS. 1 and 2. As seen in FIG. 4, mounting of the wing at a mid-level on the double-deck fuselage 2 provides adequate clearance between the ground and the relatively large-diameter, high-efficiency turbofan engines 10 and 50. Similarly, as seen in FIG. 5, mounting of the wing at a mid-level on the double-deck fuselage 2 provides adequate clearance between the ground and the even larger-diameter open-rotor engines 12 and 14. Mid-level wing placement also has the benefit of lower values of interference drag with the fuselage 2 and a reduced need for fairings between the wing panels 4 and 6 and the fuselage 2. Fairings may not be required or may be reduced in size when a mid-level wing of the type disclosed herein is used, thereby resulting in reduced weight and reduced drag due to the absence of the additional wetted surface of the fairing.

Figure 6:
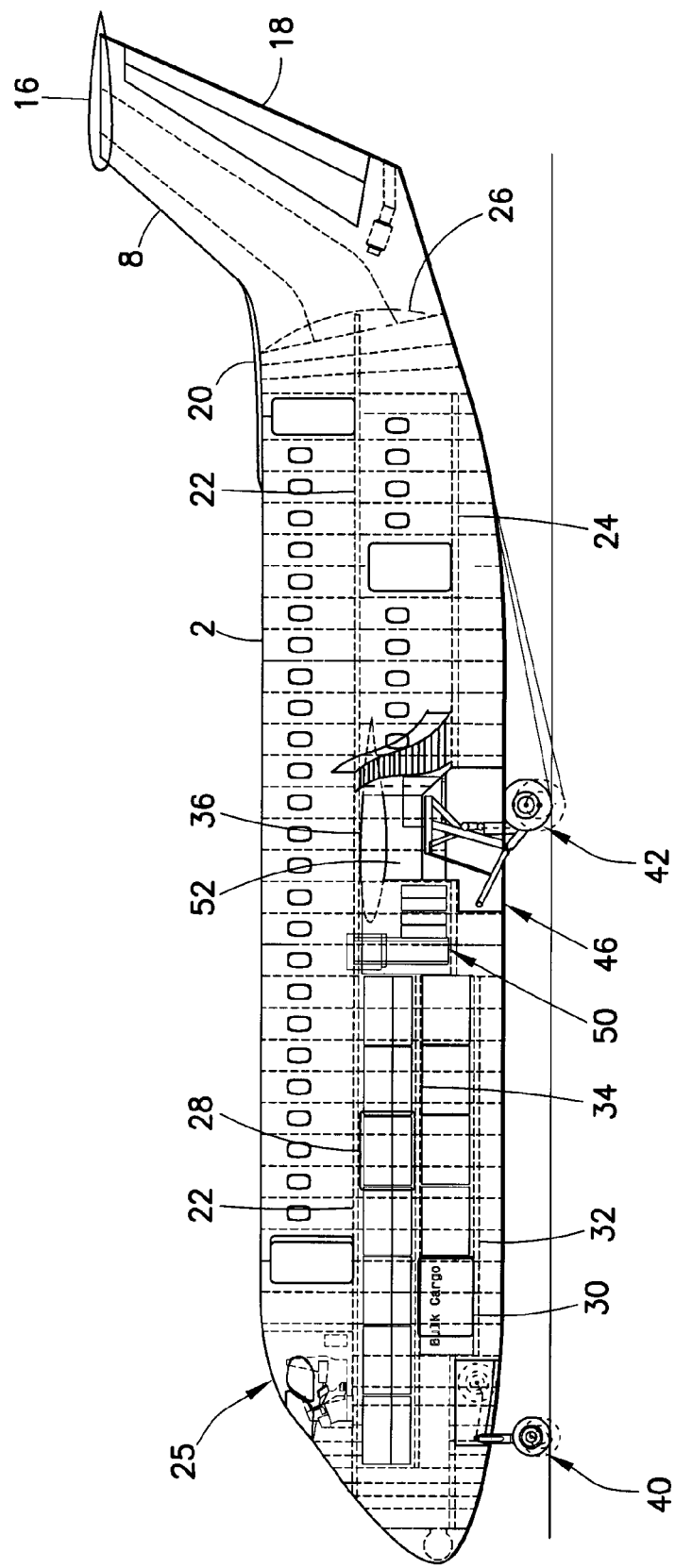
FIG. 6 is a diagram showing a side view of a double-deck airplane configured to carry cargo in the forward portion and passengers in the aft portion of the lower deck.

FIG. 6 shows the internal structure in accordance with an alternative configuration of the airplanes depicted in FIGS. 1 and 2. The configuration shown in FIG. 6 differs from that shown in FIG. 3 in that the lower deck comprises an aft lower deck 24 for passengers disposed in the aft portion of the fuselage 2 (i.e., aft of the wing box 36 and a forward lower deck 32 for cargo disposed in the forward portion of the fuselage 2 (i.e., forward of the wing box 36). The forward and aft lower decks 32 and 24 (respectively) are separated by respective spaces (i.e., wheel wells) below the wing box 36 where the main gear units are stowed. FIG. 6 further shows a main gear unit 42 in a deployed state and a wheel well 46 for receiving the main gear unit when it is stowed.

In the embodiment depicted in FIG. 6, an aft lower cabin is disposed between upper deck 22 and aft lower deck 24. The aft lower deck 24 is fitted with seats for passengers. The lower portion of the forward portion of the fuselage 2 comprises a dual-level cargo hold with a door on each level. These doors are indicated by reference numerals 28 and 30 in FIG. 6. As seen in FIG. 6, the lower level of the forward cargo hold is disposed between the forward lower deck 32 and a forward middle deck 34, while the upper level of the forward cargo hold is disposed between the forward middle deck 34 and the upper deck 22.

In accordance with a further feature of the embodiment depicted in FIG. 6, a pressurized compartment 50 is disposed between the forward cargo hold and the wing box 36. This compartment communicates with the aft lower cabin between decks 22 and 24 via a pressurized passageway 52. The passageway 52 is disposed directly below the central section of the wing box 36 and extends into the space between the left and right wheel wells that receive the stowed main gear units. Only one main gear unit 42 and one wheel well 46 are visible in FIG. 6. The compartment 50 may be configured for use as an attendant rest area or some other special purpose, as shown in greater detail in FIG. 7.

Figure 7:
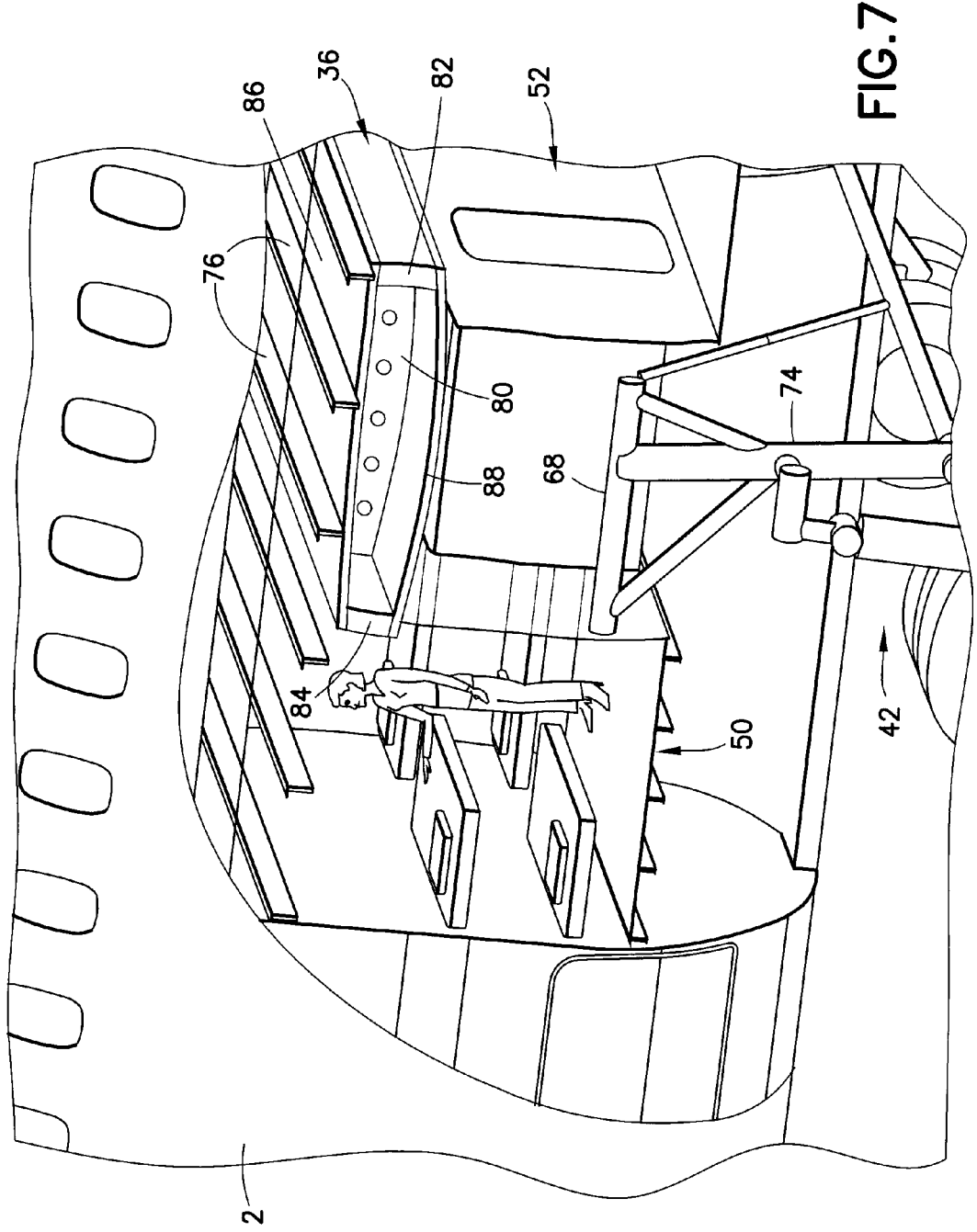
FIG. 7 is a diagram showing an isometric view of a portion of an airplane having a crew rest area or galley station between a wheel well and a cargo lobe and having a pressurized service passageway between the wheel well and a wing box in accordance with one embodiment.

Referring to FIG. 7, the wing box 36 may comprise a series of wing ribs 80 (only one rib is visible in FIG. 7) extending between a forward wing spar 82 and an aft wing spar 84. An upper skin panel 86 and a lower skin panel 88 are attached to the front and rear spars and to the wing ribs to form an enclosed box structure. The wing box 36 may be built into and supported in part by a plurality of lateral floor beams 76 of the upper deck support structure. Structures for supporting a wing box that traverses a fuselage are well known in the art and have not been depicted in FIG. 7. Such support methods may, for example, include the use of trap panels, or longitudinal floor beams.

For the exemplary construction depicted in FIG. 7, wing spars 82, 84 and upper and lower skin panels 86, 88 can be individually manufactured from composite materials and joined together with metallic joining members that are bonded to the individual composite parts to form the wing box 36. Alternatively, the spars and panels of the wing box can be manufactured, or at least partially manufactured, from metals, such as aluminum, titanium, and/or steel. For example, the forward wing spar 82 and/or the aft wing spar 84 can be manufactured from metal using conventional techniques known in the art. In yet other embodiments, one or more of the structural members identified above can be manufactured from composite materials but can also include one or more metallic facesheets or other elements. For example, in various embodiments the forward wing spar 82 and/or the aft wing spar 84 can include composite sandwich structures with one or more metallic facesheets for additional strength and/or other reasons. The upper skin panel 86 can include a core sandwiched between two facesheets constructed from layups of fiber-reinforced resin materials. In other embodiments, the facesheets can include metallic materials, such as aluminum, titanium, and/or steel in skin, panel, and/or other forms. The core of the skin panels may comprise a honeycomb center may be made of any of the following materials: aluminum, Nomex®, metal, open or closed cell foam, a composite material, or other suitable core material.

FIG. 7 shows a pressurized passageway 52 disposed directly below the central section of the wing box 36. In the vertical direction, passageway 52 extends into the space between the left and right wheel wells that receive the stowed main gear units. Only a portion of one main gear unit 42 is visible in FIG. 7. In the embodiment depicted in FIG. 7, the pressurized compartment 50 is an attendant rest area which is accessible via the passageway 52.

Still referring to FIG. 7, main gear unit 42 may be completely enclosed within the fuselage 2 when stowed, without the need for fairings, thereby further reducing drag and weight, yet when deployed, extends laterally beyond the outer mold line of the fuselage 2 to provide the airplane 30 with sufficient wheel track. A trunnion pivot 68 of each main landing gear unit may be mounted to two or more frames (not shown in FIG. 7) of the fuselage 2. Each main landing gear unit carries a plurality of ground-engaging wheels mounted to a truck or carriage (not visible in FIG. 7, but see FIG. 4). In use, the main gear unit 42 retracts laterally inward as a strut 74 is drawn inboard by actuators (not shown). The main landing gear may be deployed under the force of gravity.

Figure 9:
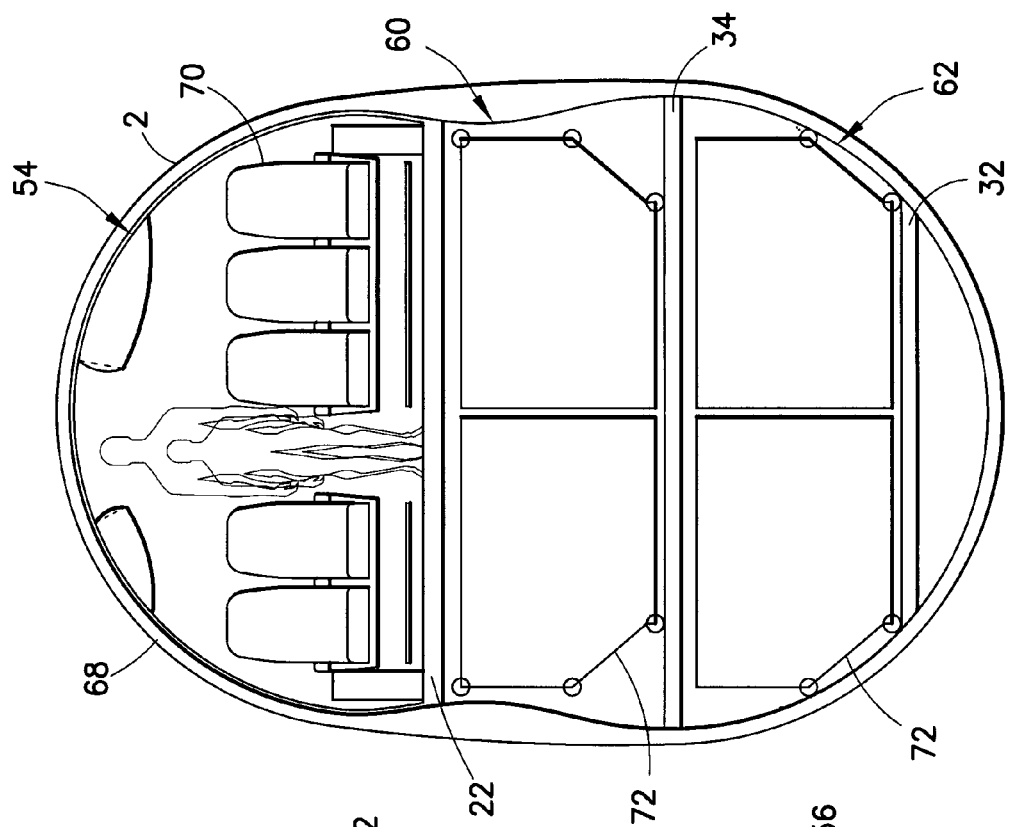
FIG. 9 is a diagram showing a sectional view of a portion of an airplane that has an upper deck for passengers and a cargo hold on a lower deck. The portion depicted can be located either forward or aft of the wing carry-through structure.
Figure 8:
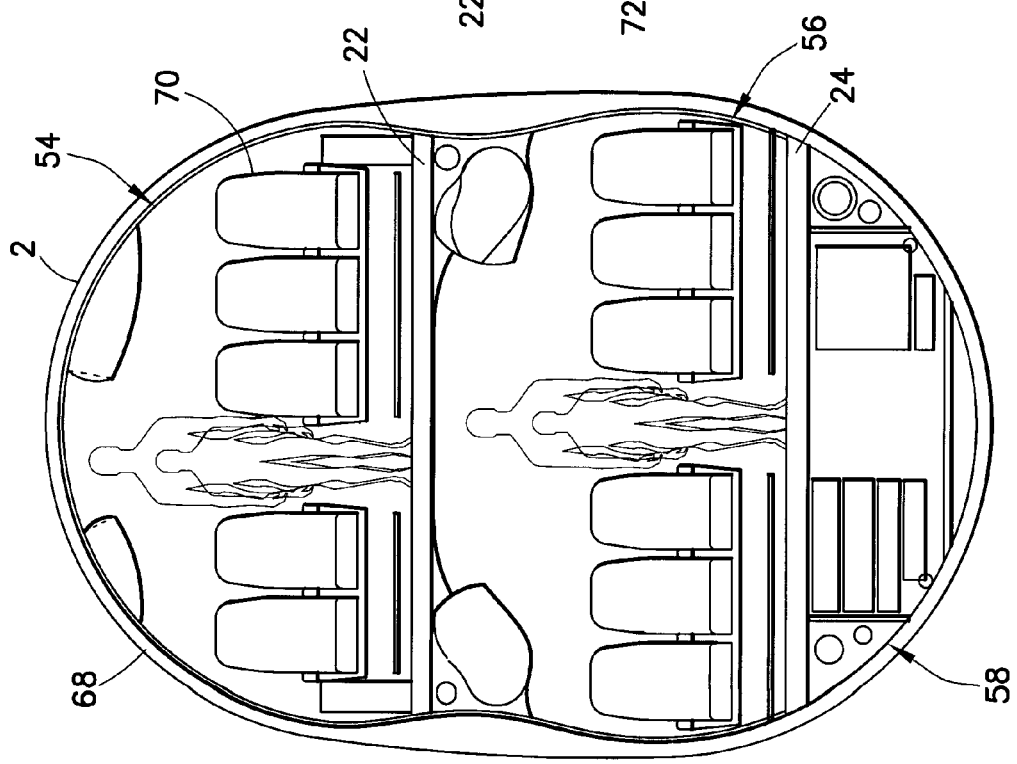
FIG. 8 is a diagram showing a sectional view of a portion of an airplane have double passenger decks forward or aft of a wing carry-through structure.

Referring now to FIGS. 8 and 9, the fuselage 2 may be of a so-called double bubble configuration comprising an upper and lower lobes. For embodiments of the type depicted in FIGS. 8 and 9, the upper deck 22 is contained within the upper lobe, while the mid-level deck 34 and the lower level decks 24 and 32 are contained within the lower lobe. The decks are attached to and supported by the circumferential frames 68 (only one of which is shown) of the fuselage 2 in a well-known manner.

FIG. 8 shows a portion of an aircraft having a cross section configured with an upper passenger cabin 54 in the upper lobe of the fuselage; and a lower passenger cabin 56 and a systems compartment 58 in the lower lobe. The lower cabin 56 is disposed between the upper deck 22 and the lower deck 24; the system compartment 58 is disposed between the lower deck 24 and the keel of the fuselage. This configuration applies to the forward portion of the fuselage 2 depicted in FIG. 3 and to the aft portion of the fuselage 2 depicted in FIG. 6. Both the upper and lower decks 22, 24 are fitted with seats 70 for passengers. In the embodiment depicted in FIG. 8, the upper cabin has five seats in each row, while the lower cabin has six seats in each row.

FIG. 9 shows a portion of an aircraft having a cross section configured with an upper passenger cabin 54 in the upper lobe of the fuselage; and upper and lower levels 60 and 62 of a cargo hold in the lower lobe. The upper level 60 of the cargo hold is disposed between the upper deck 22 and the middle deck 34; the lower level 62 of the cargo hold is disposed between the middle deck 34 and the lower deck 32. This configuration applies to the aft portion of the fuselage 2 depicted in FIG. 3 and to the forward portion of the fuselage 2 depicted in FIG. 6. The upper deck 22 is fitted with seats 70 for passengers (e.g., five seats in each row), while the upper and lower levels 60 and 62 of the cargo hold are configured to receive cargo containers 72 (two abreast on each level) having a standardized size well known in the art.

Figure 11:
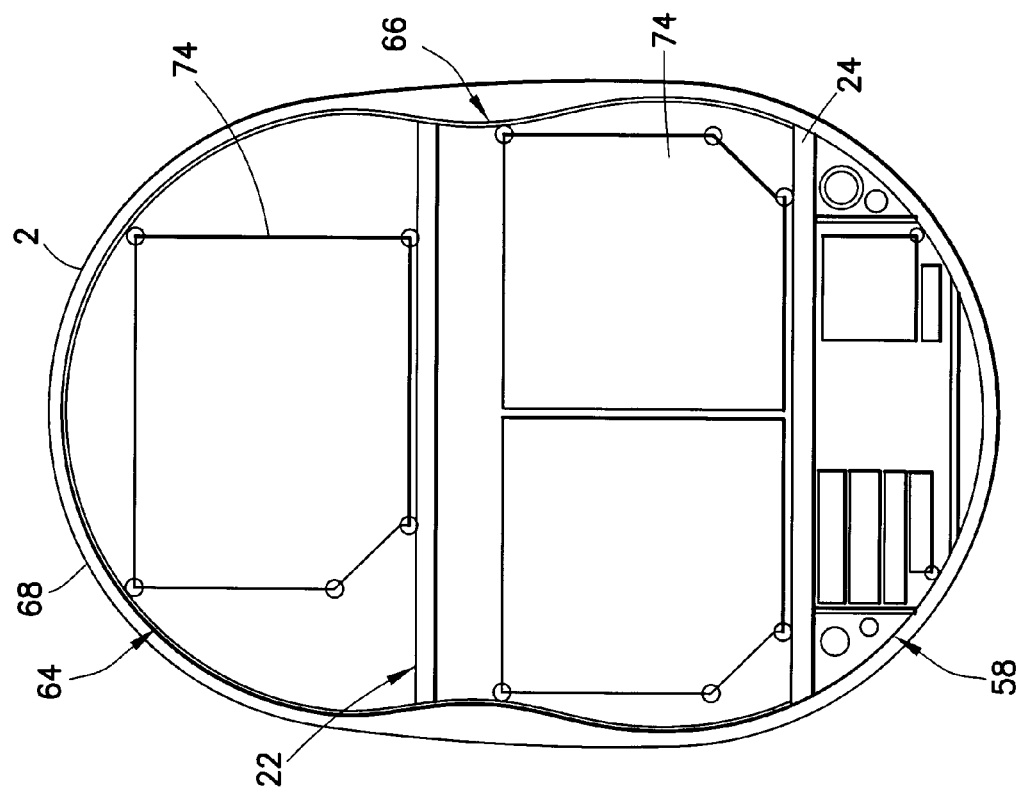
FIGS. 10 and 11 are diagrams showing sectional views of respective all-cargo configurations for two exemplary freighter conversions of the airplane shown in either FIG. 1 or FIG. 2.
Figure 10:
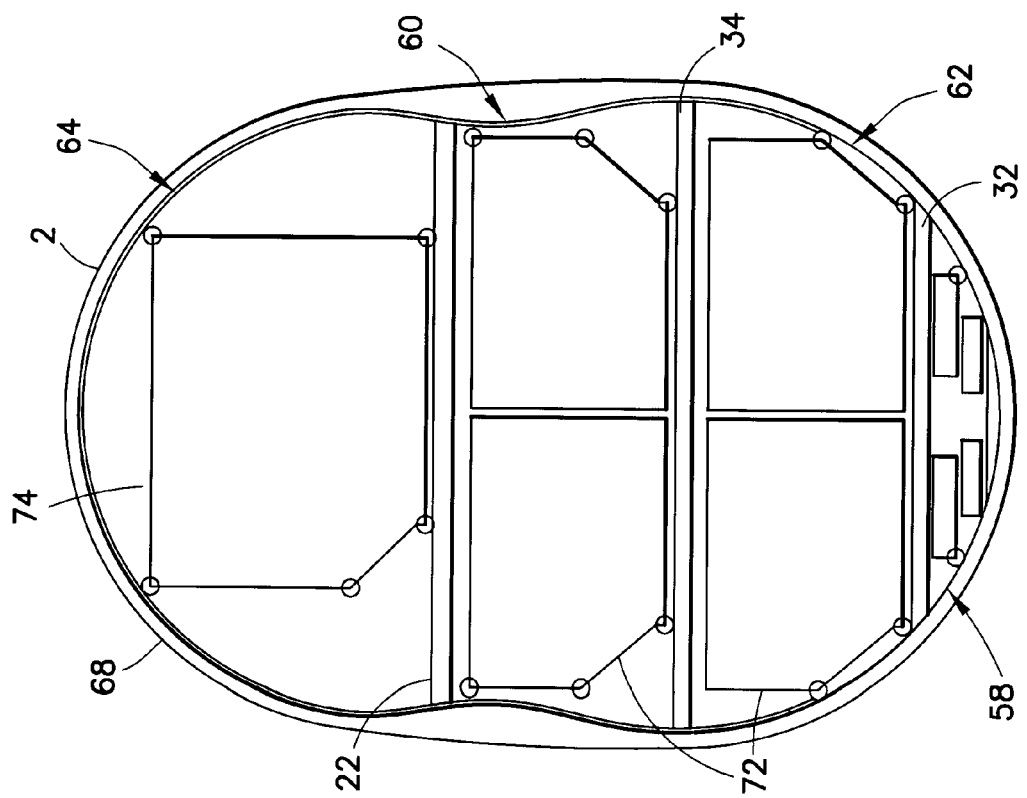

FIGS. 10 and 11 show sectional views of respective all-cargo configurations for two exemplary freighter conversions of the airplane shown in either FIG. 1 or FIG. 2. More specifically, the configuration shown in FIG. 9 can be converted into the configuration shown in FIG. 10 without moving the decks 22, 34 and 32. In the configuration shown in FIG. 10, the upper passenger cabin in the upper lobe (as seen in FIG. 9) is replaced by an upper cargo hold 64 suitable for receiving large cargo containers 74 having a standardized size well known in the art. The upper and lower levels 60 and 62 of the lower cargo hold in the lower lobe may be the same as those seen in FIG. 9. Similarly, the configuration shown in FIG. 8 can be converted into the configuration shown in FIG. 11 without moving the decks 22 and 24. In the configuration shown in FIG. 11, the upper passenger cabin in the upper lobe (as seen in FIG. 8) is replaced by an upper cargo hold 64 suitable for receiving large cargo containers 74, while the lower passenger cabin in the lower lobe (as seen in FIG. 8) is replaced by a lower cargo hold 66 suitable for receiving large cargo containers 74.

In view of the foregoing, airplanes of the type disclosed herein are potentially easily convertible from an all-passenger to an all-cargo configuration with the installation of cargo doors in the basic design. This is important for airlines that run high passenger loads for instance in the summer or spring and need cargo lift in the winter. With this aircraft configuration, the airlines have an extremely flexible aircraft.

Figure 14:
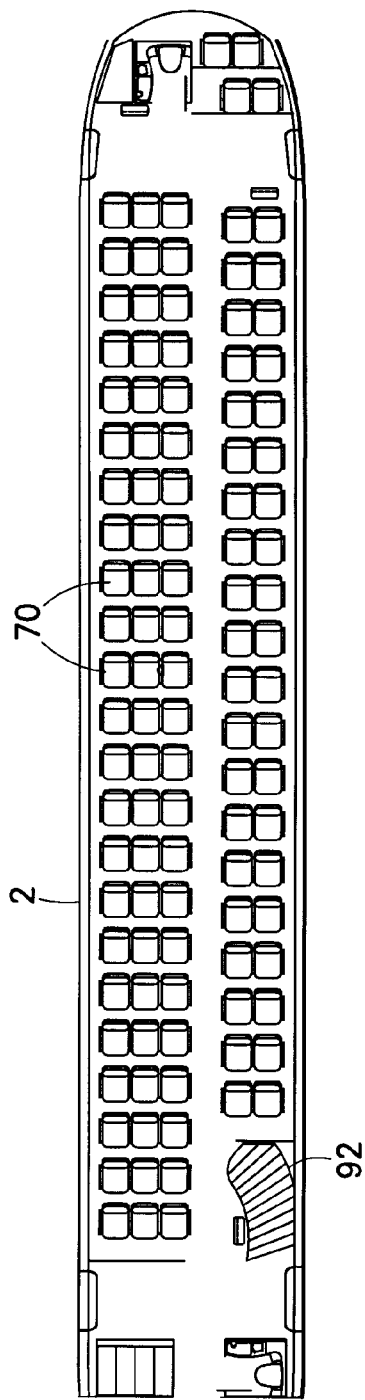
FIGS. 14 and 15 are diagrams showing respective plan views of an upper passenger deck and a lower passenger/cargo deck in accordance with the embodiment depicted in FIG. 3.
Figure 15:
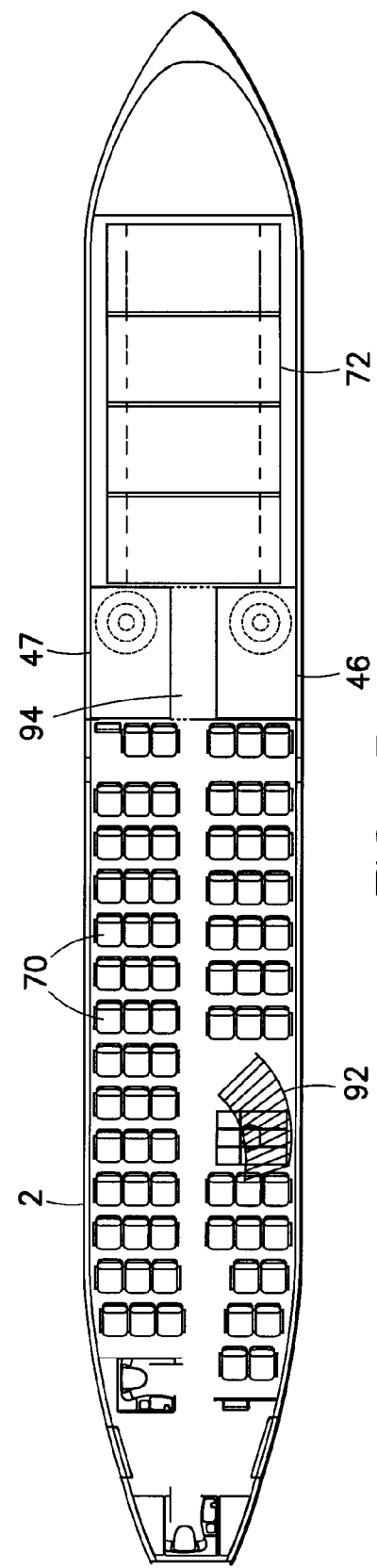

FIGS. 14 and 15 are respective plan views of an upper passenger deck and a lower passenger/cargo deck in accordance with the embodiment depicted in FIG. 3. The upper deck seen in FIG. 14 accommodates five seats in most rows, while the forward lower deck seen in FIG. 15 accommodates rows having six seats. Passengers may walk from one level to another via a stairway 92. FIG. 15 also shows a pair of wheel wells 46 and 47 for stowing the main landing gear as previously described. The space between the wheel wells 46 and 47 may be occupied by a service passage 94.

Figure 16:
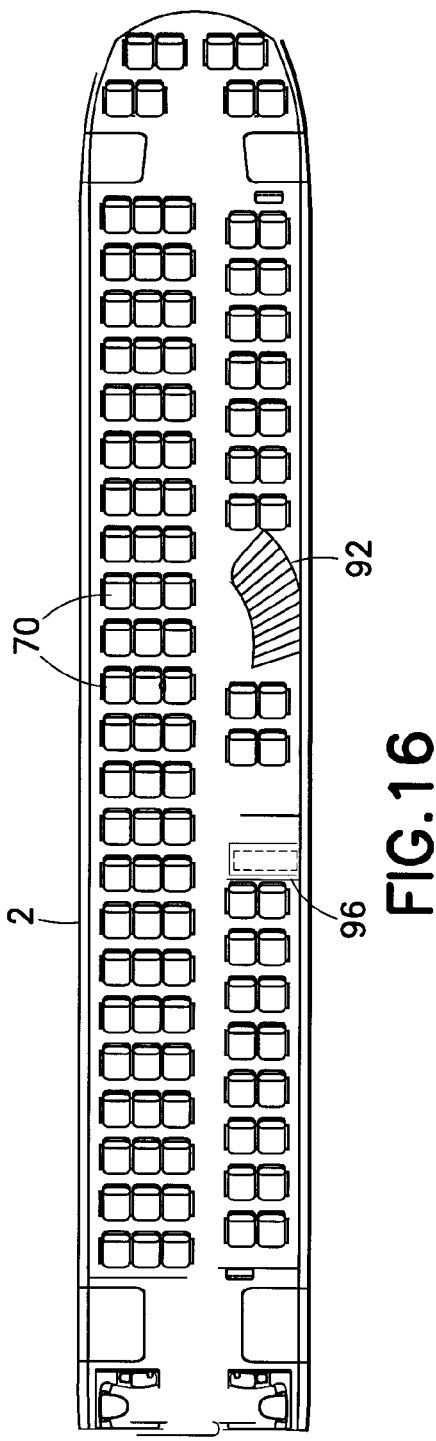
FIGS. 16 and 17 are diagrams showing respective plan views of an upper passenger deck and a lower cargo/passenger deck in accordance with the embodiment depicted in FIG. 6.
Figure 17:
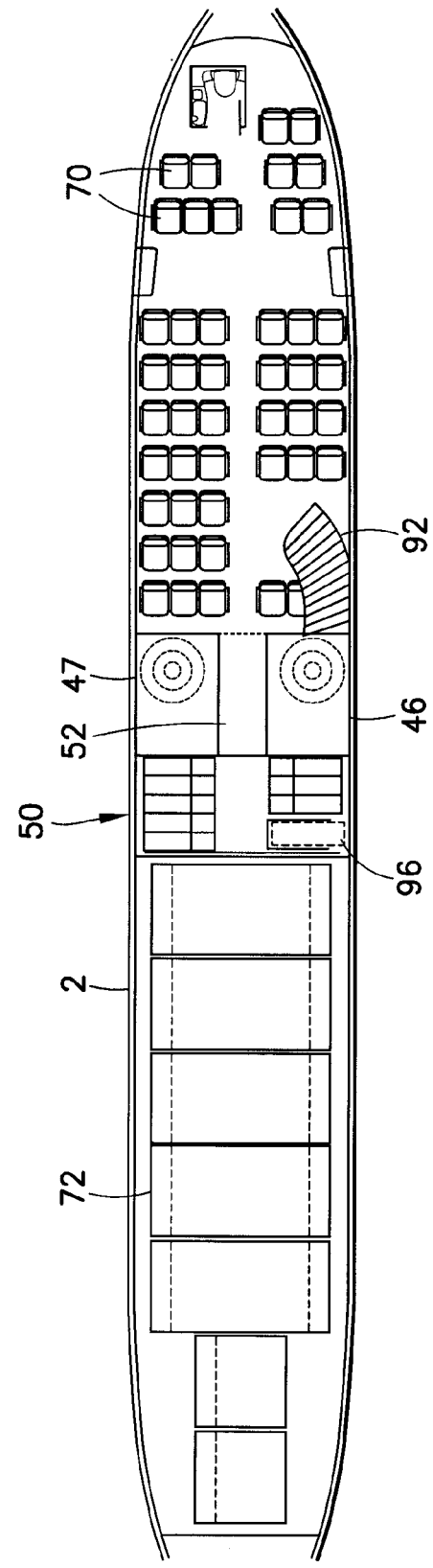

FIGS. 16 and 17 are respective plan views of an upper passenger deck and a lower passenger/cargo deck in accordance with the embodiment depicted in FIG. 6. Again the upper deck accommodates five seats in most rows (see FIG. 16), while the aft lower deck seen in FIG. 17 accommodates rows having six seats. Passengers may walk from one level to another via a stairway 92. FIG. 17 also shows a pair of unpressurized wheel wells 46 and 47 for stowing the main landing gear and a pressurized compartment 50 (e.g., a galley station or an attendant rest area) which communicates with the aft passenger cabin by way of a pressurized passageway 52, as previously described with reference to FIG. 7. An elevator 96 may be provided for transporting in-flight service carts between floors.

In accordance with a further aspect of the configurations disclosed herein, an optimized wing box geometry reduces the distance between the centerline of the main landing gear and the center of gravity of the airplane. This concept will now be explained with reference to FIGS. 12 and 13, in which the vertical solid line CL indicates the centerline of the fuselage and the vertical dashed line SOB (side of body) indicates the outer mold line of the fuselage.

Figure 12:
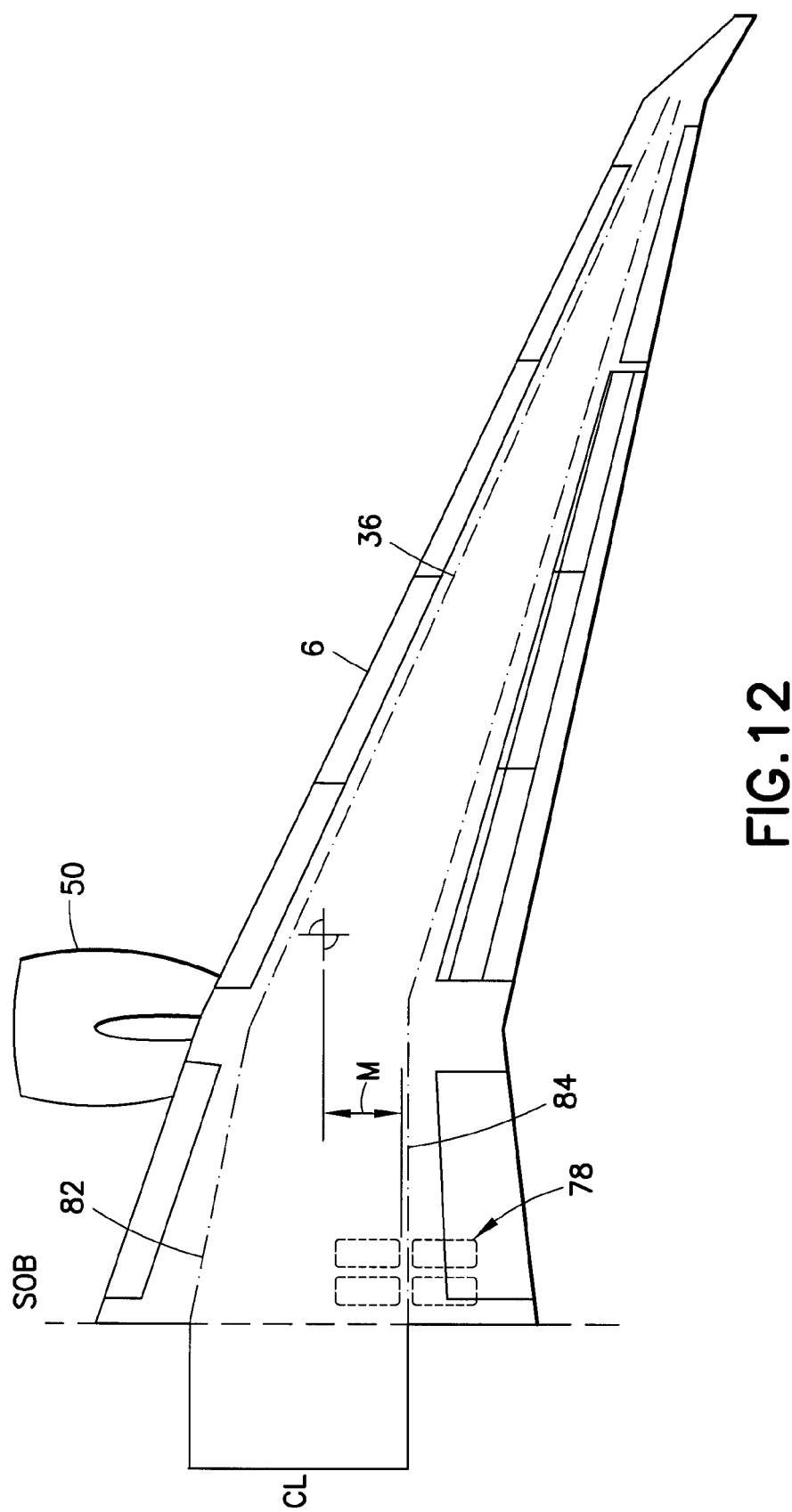
FIG. 12 is a diagram showing a plan view of one wing panel of the turbofan engine-equipped airplane depicted in FIG. 1.

FIG. 12 is a plan view of one wing panel 6 of the airplane depicted in FIGS. 1 and 4. A high-bypass-ratio turbofan engine 50 is mounted under the leading edge of the wing panel 6. The inboard section of the wing box 36 (i.e., the portion of the wing box disposed between the engine centerline and the fuselage) comprises an aft wing spar 84 which is un-swept (i.e., extends generally transverse to the centerline of the fuselage) and a forward wing spar 82 having a slight sweep angle in the aft direction. In the outboard section of the wing box 36, the forward and aft wing spars are swept. In this example, each main landing gear unit has two rows of wheels, each row consisting of two wheels. The footprint for such a main gear unit is indicated by the dashed rectangles generally designated by reference numeral 78. The distance between the centerline of the main landing gear and the center of gravity (CG) of the airplane is indicated by the double-headed arrow M (also called the ground contact CG margin). By reducing the sweep angle of the forward wing spar 82 and making the rear spar 84 un-swept in the inboard section of the wing box 36, the distance between the centerline of the main gear and the main wing box can be reduced as compared to turbofan engine-equipped airplanes having swept forward and aft wing spars in the inboard wing box section. Also, by providing an un-swept aft wing spar 84, the trailing edge of the inboard section of wing panel 6 can be swept forward.

Figure 13:
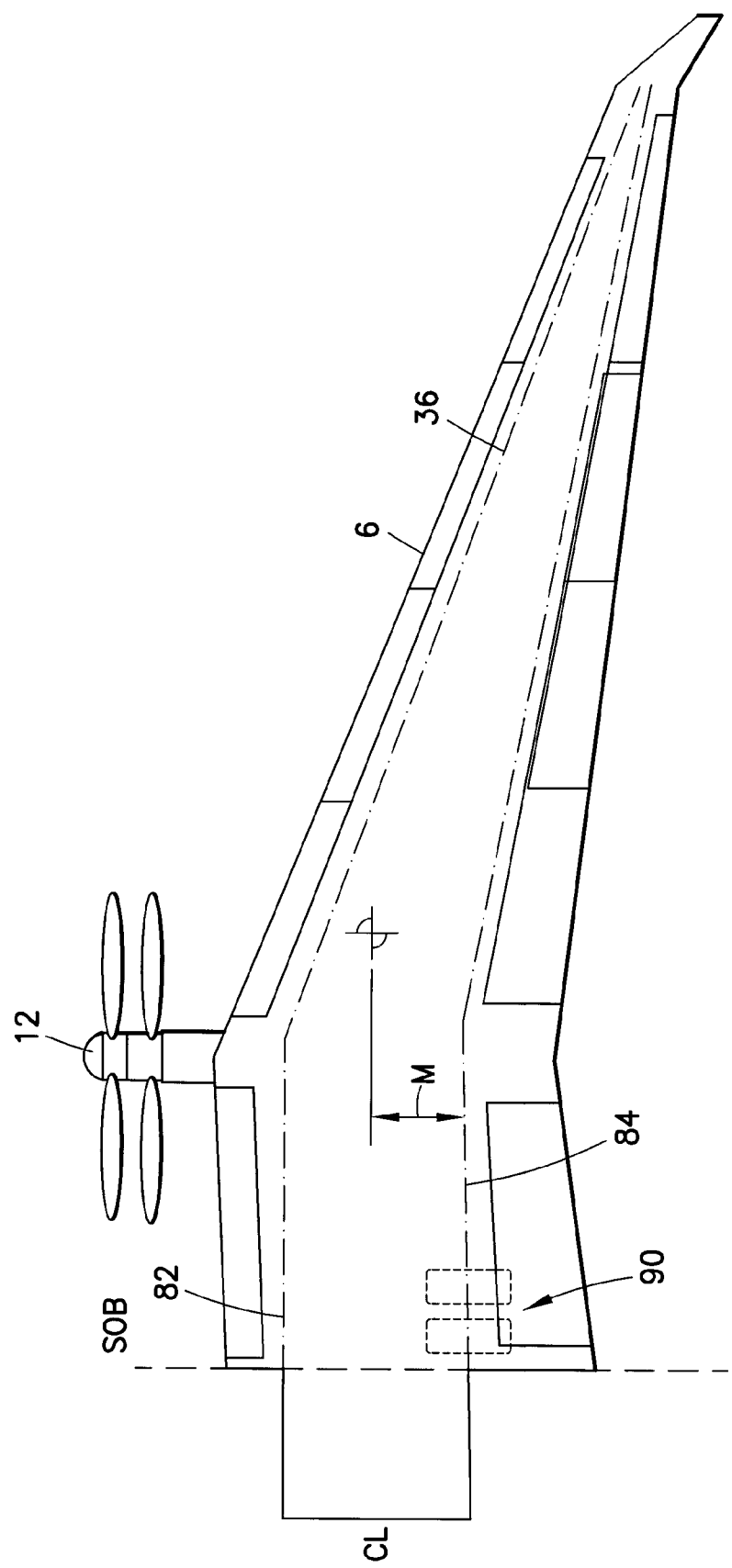
FIG. 13 is a diagram showing a plan view of one wing panel of the open-rotor engine-equipped airplane depicted in FIG. 2.

FIG. 13 is a plan view of one wing panel 6 of the airplane depicted in FIGS. 2 and 5. An open-rotor engine 12 is mounted under the leading edge of the wing panel 6. In this embodiment, the inboard section of wing box 36 comprises an un-swept forward wing spar 82 and an un-swept aft wing spar 84. In the outboard section of the wing box 36, the forward and aft wing spars are swept, with the forward wing spar 82 being swept in the aft direction to a greater degree that the sweep angle of the aft wing spar 84. In this example, each main landing gear unit has one row of two wheels. The footprint for such a main gear unit is indicated by the dashed rectangles generally designated by reference numeral 90. The ground contact CG margin is again indicated by a double-headed arrow M. By making the forward and aft wings spars un-swept in the inboard section of the wing box 36, the margin M can be reduced as compared to open-rotor engine-equipped airplanes having swept forward and aft wing spars in the inboard wing box section.

In accordance with another aspect of the configurations disclosed herein, the airplane comprises an integrated vertical fin and an aft-extended pressurized upper deck area for reduced double-deck wetted area.

Figure 18:
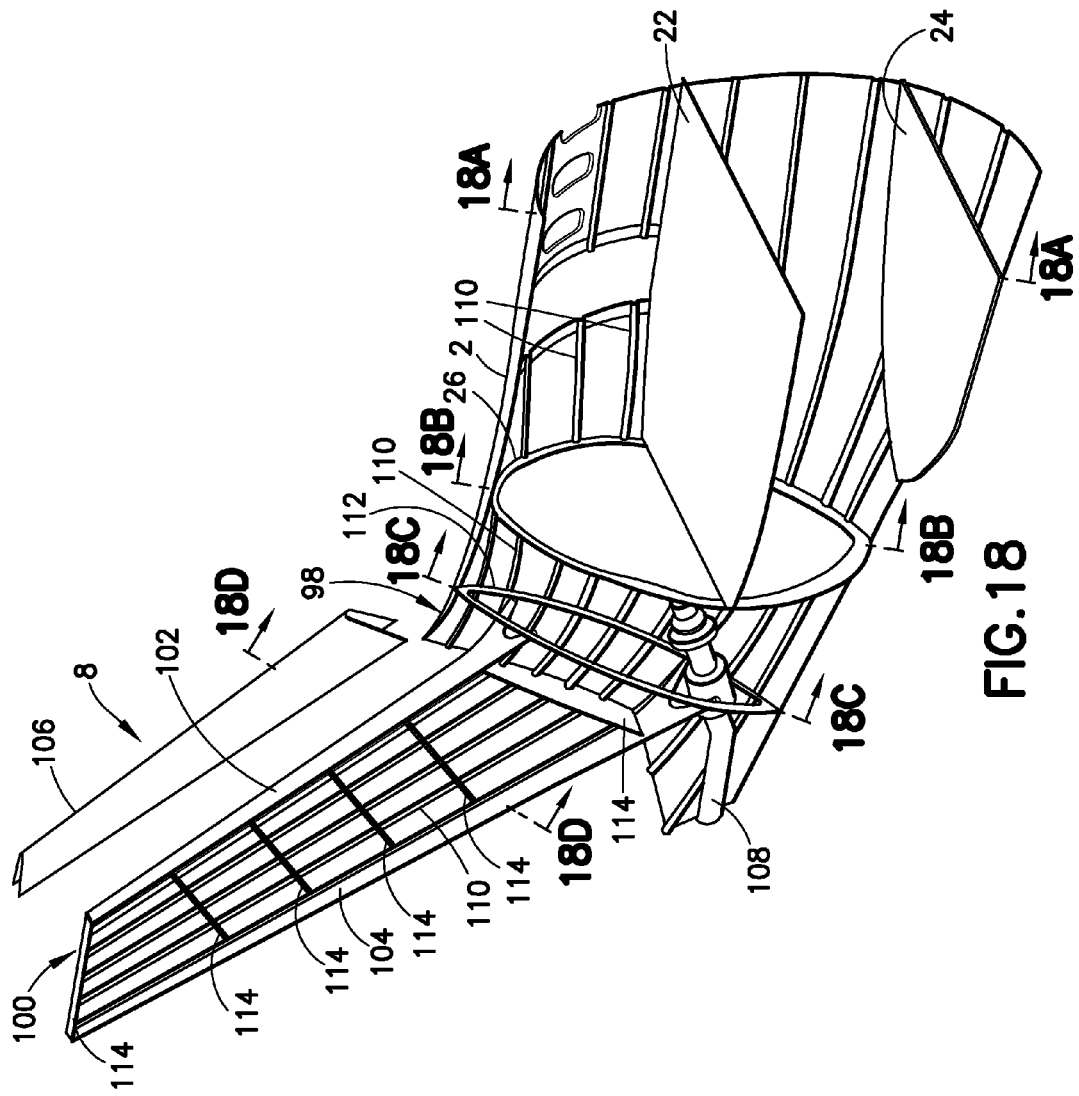
FIG. 18 is a diagram showing the integration of a vertical fin to an aft portion of a fuselage of a double-deck airplane in accordance with any one of the embodiments depicted in FIGS. 1 through 4.

As seen in FIG. 18, the double-deck fuselage structure 2 is extended to form a blending structure 98 that transitions into a structural box 100 of the vertical fin 8. (To avoid clutter in the drawing, FIG. 18 does not show the circumferential frames of the fuselage.) The blended structure creates a smooth transition between the body and the vertical tail. Thus there is no break between the aft portion of the fuselage and the vertical fin, but rather there is a smooth seamless transition that reduces the wetted area as compared to conventional double-deck aircraft.

Still referring to FIG. 18, the aft pressure bulkhead 26 forms an airtight boundary between the pressurized upper deck area space and the unpressurized space behind the bulkhead. The upper deck 22 extends to the aft pressure bulkhead 26. The extension of the upper deck into the blended area increases the deck area and the usable space. Also, with the pressurized space pushed further back into the tail area, a smaller pressure bulkhead can be installed. The structure 108 behind the aft pressure bulkhead 26 in FIG. 18 is an auxiliary power unit.

The changing outer profile of the aft portion of the fuselage can be seen in the progression of FIGS. 18A-18D, which show the outer profiles of the fuselage at respective cross sections indicated in FIG. 18. As seen in FIGS. 18A-18D, the fuselage structure undergoes three-dimensional blending from an oval section shown in FIG. 18A to a flat section shown in FIG. 18D. FIG. 18A shows the oval outer profile of fuselage 2 at a distance forward of the aft pressure bulkhead 26. FIG. 18B shows the narrower oval outer profile of the fuselage 2 at the location of the aft pressure bulkhead. FIG. 18C shows the still narrower outer profile of the blended structure 98 at a location between the aft pressure bulkhead and the start of the structural box of the vertical fin. FIG. 18D shows the flat outer profile of the vertical fin structural box 100 at the location indicated by line D-D in FIG. 18. The V-shaped dashed line in FIG. 18D represents a rudder 18; the curved dashed line represents a removable leading edge structure 106.

As seen in FIG. 18, the fuselage 2 comprises a plurality of stringers 110 which extend at least from a location forward of the aft pressure bulkhead 26 to a distal end of the vertical fin 8, the stringers being continuous or spliced. The stringers 110 in the aft portion of the fuselage are attached to a multiplicity of circumferential frames. Only one such frame 112 is shown in FIG. 18. The stringers 110 in the integrated vertical fin portion 8 of the fuselage are attached to a multiplicity of ribs 114, which perform the same role as the frames. The fuselage further comprises a skin that is attached to the stringers 110. The skin extends from a location forward of the aft pressure bulkhead 26 to a distal end of the vertical fin 8, the skin also being continuous or spliced. Because the stringers and skin are continuous or spliced, there is no break (or discontinuity) in the structural load path or in the aerodynamic surfaces of the extended fuselage as the latter blends into the vertical fin.

Still referring to FIG. 18, the vertical fin structural box 100 may comprise a forward tail spar 102 and an aft tail spar 104. The forward tail spar 102 is needed because the leading edge structure 106 is removable for easy access to systems inside the vertical tail. Optionally, the leading edge structure is not removable, in which case forward tail spar 102 would not be needed. The aft tail spar 104 is mandatory if the fin has a rudder. The forward and aft tail spars can be integrated to the main body in many ways. FIG. 18 shows an embodiment in which the lower end of the forward and aft tail spars splits into two tapered ends that are attached to the frame 112, which is an integration element. The aft tail spar 104 may extend downward to the fuselage keel line. The rudder (not shown in FIG. 18) can be mounted to the aft tail spar 104 of the vertical tail structural box 100 and also extends to the fuselage keel line, thereby providing a larger control surface area for improved airplane yaw control.

The aircraft disclosed above are designed around being extremely flexible both in engine installation and payload configuration. Aircraft configurations are conventionally designed around a single type of engine. The configurations disclosed above can accept multiple different types of engines without changing the basic aircraft configuration. Moreover, having two full deck passenger/cargo areas creates an aircraft that can be easily tailored to meet airline mission requirements. Accordingly, the fuselage of the airplane is tailored around a twin-deck configuration. In particular, the fuselage is tailored and shaped to reduce the wetted area per passenger seat count and hence reduce the drag on and the equivalent fuel burn of the aircraft.

The innovations disclosed herein provide airplanes that have several advantages. First, the airplanes potentially having a lower ratio of drag to seat count because of the aircraft shaping. The aircraft are also easily adaptable because of the double-deck arrangement to multiple missions and airline requirements or changing needs, especially in markets where cargo and passenger volume are both important commodities. This concept also provides an airplane that can be quickly converted from an all-cargo configuration to an all-passenger configuration and vice versa. The same aircraft design can accommodate multiple engine configurations, again allowing for flexibility in airline operations and for airline customers.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

The invention claimed is:

1. An airplane comprising:
    a fuselage comprising a central portion, a forward portion extending forward of said central portion, and an aft portion extending aft of said central portion;
    upper and lower decks disposed inside said fuselage, said upper deck extending continuously from said forward portion to said aft portion, and said lower deck being discontinuous and comprising a forward lower deck disposed in said forward portion of said fuselage and an aft lower deck disposed in said aft portion of said fuselage, said forward and aft lower decks being separated;
    a wing box comprising a central section which passes through and beyond a portion of said central portion of said fuselage that is disposed below said upper deck and further comprising left and right inboard wing box sections disposed outside said fuselage;
    left and right airfoils attached to said wing box and disposed outside said fuselage on opposing sides thereof; and a main landing gear mounted inside said central portion of said fuselage and stowed in an unpressurized space located below said central section of said wing box and between said forward and aft lower decks.

2. The airplane as recited in claim 1, wherein a space above said upper deck is pressurized and configured to seat passengers, a space between said upper deck and said forward lower deck is configured to receive cargo containers, and a space between said upper deck and said aft lower deck is pressurized and configured to seat passengers.

3. The airplane as recited in claim 2, further comprising a first pressurized space disposed between said wing box and said main landing gear and extending into a space adjacent said unpressurized space where said main gear unit is stowed, and a second pressurized space disposed between said forward lower deck and said upper deck and located forward of said first pressurized space, said first pressurized space being configured to allow passage from said pressurized space between said upper deck and said aft lower deck to said second pressurized space.

4. The airplane as recited in claim 1, wherein a space above said upper deck is pressurized and configured to seat passengers, a space between said upper deck and said aft lower deck is configured to receive cargo containers, and a space between said upper deck and said forward lower deck is pressurized and configured to seat passengers.

5. The airplane as recited in claim 1, wherein a space above said upper deck and spaces between said upper deck and said forward and aft lower decks are configured to receive cargo containers.

6. The airplane as recited in claim 1, further comprising first and second high-bypass ratio turbofan engines respectively mounted to said left and right airfoils.

7. The airplane as recited in claim 1, further comprising first and second open-rotor engines respectively mounted to said left and right airfoils.

8. The airplane as recited in claim 1, further comprising a forward middle deck disposed between said upper deck and said forward lower deck or an aft middle deck disposed between said upper deck and said aft lower deck, said forward middle and lower decks or said aft middle and lower decks being configured to receive cargo containers.

9. The airplane as recited in claim 1, wherein said fuselage further comprises an integrated vertical fin portion extending aft from said aft portion of said fuselage, said aft portion and said integrated vertical fin portion tapering gradually to form a vertical fin trailing edge at an end of said fuselage.

10. The airplane as recited in claim 9, further comprising an aft pressure bulkhead disposed in said aft portion of said fuselage, wherein said fuselage further comprises a plurality of stringers which extend at least from said bulkhead to a distal end of said vertical fin portion, said stringers being continuous or spliced.

11. The airplane as recited in claim 10, wherein said fuselage further comprises a skin which extends at least from said aft pressure bulkhead to a distal end of said vertical fin portion, said skin being structurally continuous.

12. The airplane as recited in claim 9, further comprising a rudder mounted to said fin trailing edge.

13. An airplane comprising:
a fuselage comprising a central portion, a forward portion extending forward of said central portion, an aft portion extending aft of said central portion, and an integrated vertical fin portion extending aft of said aft portion;
upper and lower decks disposed inside said fuselage; and
an aft pressure bulkhead disposed in said aft portion of said fuselage,
wherein said upper deck extends from said forward portion of said fuselage to said bulkhead, and said fuselage further comprises a plurality of stringers which extend at least from said aft pressure bulkhead to a distal end of said vertical fin portion, said stringers being structurally continuous.

14. The airplane as recited in claim 13, wherein said fuselage further comprises a skin which extends at least from said aft portion to a distal end of said vertical fin portion, said skin being structurally continuous.

15. The airplane as recited in claim 13, wherein a cross-sectional profile of said fuselage has a width which decreases gradually from a point forward of said aft pressure bulkhead to a point where said vertical fin portion begins.

16. The airplane as recited in claim 13, wherein said vertical fin portion of said fuselage comprises a plurality of ribs to which said stringers are attached, and said aft portion of said fuselage comprises a plurality of frames to which said stringers are attached.

17. The airplane as recited in claim 13, wherein said aft portion and said integrated vertical fin portion taper gradually to form a fin trailing edge at an end of said fuselage, further comprising a rudder mounted to said fin trailing edge.

18. An airplane comprising:
a fuselage comprising a central portion, a forward portion extending forward of said central portion, and an aft portion extending aft of said central portion;
upper and lower decks disposed inside said fuselage, said upper deck extending continuously from said forward portion to said aft portion, and said lower deck being discontinuous and comprising a forward lower deck disposed in said forward portion of said fuselage and an aft lower deck disposed in said aft portion of said fuselage, said forward and aft lower decks being separated by a portion of said central portion of said fuselage;
a wing box comprising a central section which passes through a portion of said central portion of said fuselage that is disposed below said upper deck, said central section comprising forward and aft wing spars;
a first pressurized space disposed below said wing box; and
a main landing gear mounted inside said central portion of said fuselage and disposed in an unpressurized space disposed below said first pressurized space.

19. The airplane as recited in claim 18, wherein a space above said upper deck is pressurized and configured to seat passengers, a space between said upper deck and said forward lower deck is configured to receive cargo containers, a space between said upper deck and said aft lower deck is pressurized and configured to seat passengers, and said central portion of said fuselage further comprises a second pressurized space disposed below said upper deck and between said first pressurized space and said forward lower deck, said first pressurized space being configured to allow passage from said pressurized space between said upper deck and said aft lower deck to said second pressurized space.

20. The airplane as recited in claim 1 wherein a trailing edge of a first portion of each wing airfoil inboard of an engine line is swept forward and a trailing edge of a second portion of each wing airfoil outboard of said engine line is swept aft.

21. The airplane as recited in claim 1, wherein each of said left and right inboard wing box sections comprises a respective unswept aft wing spar.

22. The airplane as recited in claim 1, further comprising a pressurized passageway disposed directly below said central section of said wing box and extending into a space adjacent said unpressurized space where said main gear unit is stowed.

23. The airplane as recited in claim 9, wherein said aft portion of said fuselage comprises a circumferential frame, and said integrated vertical fin portion comprises an aft tail spar having first and second tapered ends which are attached to said circumferential frame at respective locations.

* * * * *

UNITED STATES PATENT AND TRADEMARK OFFICE
CERTIFICATE OF CORRECTION

PATENT NO. : 8,746,616 B2
APPLICATION NO. : 13/276357
DATED : June 10, 2014
INVENTOR(S) : Sergey D. Barmichev et al.

It is certified that error appears in the above-identified patent and that said Letters Patent is hereby corrected as shown below:

Title page, item (75) Inventors, delete "Sandrithi" and insert --Sankrithi-- therefor.

Signed and Sealed this
Sixteenth Day of September, 2014

Michelle K. Lee
*Deputy Director of the United States Patent and Trademark Office*